(12) United States Patent
Tai (10) Patent No.: US 11,870,607 B2
(45) Date of Patent: Jan. 9, 2024

(54) SCALABLE PHYSICAL LOOP DETECTION IN NON-NATIVE VIRTUAL LOCAL AREA NETWORKS (VLANS)

(71) Applicant: Fortinet, Inc., Sunnyvale, CA (US)

(72) Inventor: Wayming D. Tai, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 89 days.

(21) Appl. No.: 17/139,856

(22) Filed: Dec. 31, 2020

(65) Prior Publication Data

US 2022/0209994 A1    Jun. 30, 2022

(51) Int. Cl.
*H04L 12/46* (2006.01)
*H04L 12/42* (2006.01)
*H04L 101/622* (2022.01)
*H04L 47/6295* (2022.01)

(52) U.S. Cl.
CPC .......... *H04L 12/4666* (2013.01); *H04L 12/42* (2013.01); *H04L 47/6295* (2013.01); *H04L 2101/622* (2022.05)

(58) Field of Classification Search
CPC . H04L 12/4666; H04L 12/42; H04L 47/6295; H04L 2101/622; H04L 12/467
See application file for complete search history.

(56) References Cited

U.S. PATENT DOCUMENTS

| 10,469,361 B1* | 11/2019 | Bayross | H04L 45/18 |
| 2007/0118595 A1* | 5/2007 | Jain | H04L 43/16 |
| | | | 709/203 |
| 2010/0080239 A1* | 4/2010 | Sergeev | H04L 45/66 |
| | | | 370/401 |
| 2010/0246410 A1* | 9/2010 | Tallet | H04L 43/12 |
| | | | 370/244 |
| 2020/0151127 A1* | 5/2020 | Amento | G06F 15/17331 |

OTHER PUBLICATIONS

"FortiSwitchOS Administration Guide—Standalone Mode Version 6.0.1", printed from https://docs.fortinet.com/document/fortiswitch/7.0.1/administration-guide Jun. 2019.

* cited by examiner

*Primary Examiner* — Nishant Divecha
(74) *Attorney, Agent, or Firm* — Jaffery Watson Mendonsa & Hamilton LLP (57) ABSTRACT

Systems and methods for detecting physical loops in both native and non-native VLANs are provided. According to one embodiment, a processing resource of a network switch detects a physical loop in a non-native Virtual Local Area Network (VLAN) by configuring a set of one or more network chips (e.g., an ASIC) associated with an interface associated with the non-native VLAN of multiple interfaces of the network switch to provide an indication (e.g., a Media Access Control (MAC) address or a packet) regarding a MAC move event detected on the interface. Responsive to receipt of the indication, it is determined whether a number of MAC move events for the interface meets an event count threshold within each unit of time (e.g., one or more seconds) of multiple consecutive units of time. When the determination is affirmative, the existence of the physical loop is identified.

20 Claims, 8 Drawing Sheets

SCALABLE PHYSICAL LOOP DETECTION IN NON-NATIVE VIRTUAL LOCAL AREA NETWORKS (VLANS)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present disclosure generally relate to loop detection in networks. In particular, embodiments of the present disclosure relate to a scalable approach for physical loop detection in non-native Virtual Local Area Networks (VLANs).

Description of the Related Art

A switching loop or a bridge loop at layer 2 of the Open Systems Interconnection (OSI) model may be detected when there is more than one path between multiple switches of a network. There are many solutions to prevent layer 2 loops, including, among others, the Spanning-Tree Protocol (STP), Bridge Protocol Data Unit (BPDU), and Root guard.

SUMMARY

Systems and methods are described for detecting physical loops in both native and non-native VLANs. According to one embodiment, a processing resource of a network switch detects a physical loop in a non-native Virtual Local Area Network (VLAN) by configuring a set of one or more network chips associated with an interface associated with the non-native VLAN of multiple interfaces of the network switch to provide an indication regarding a Media Access Control (MAC) move event for the interface. Responsive to receipt of the indication, it is determined whether a number of MAC move events for the interface meets an event count threshold within each unit of time of multiple consecutive units of time. When the determination is affirmative, the existence of the physical loop is identified.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for detecting physical loops in both native and non-native VLANs. Using a strict mode of loop-detection, a switching device using a legacy loop detection approach may send loop-guard packets only within a native VLAN's broadcast domain. While this approach works well for identifying the existence of a physical loop within the native VLAN, it cannot detect a physical loop in one of the non-native VLANs, for example, if the loop-guard broadcast packets are blocked or there is no physical loop in the native VLAN. One proposed approach to address this issue involves sending loop-guard packets on all VLANs. As those skilled in the art will appreciate, such an approach does not scale well as the number of VLANs increases because it requires transmission of at least one loop-guard packet per VLAN broadcast domain. Assuming 4,000 VLANs are configured for a loop-guard enabled interface, there are 4,000 broadcast domains, thereby requiring 4,000 loop-guard packets in the worst cast to detect loop.

Various embodiments described herein seek to provide a scalable enhanced loop guard approach for detecting physical loops in non-native VLANs by using MAC address movement/flap (which may also be referred to herein as "MAC flap," a "MAC move event," and the like) as an indicator of a layer 2 loop. A MAC flap is caused when a switch receives packets from two different interfaces with the same source MAC address. The enhanced loop guard approach described herein may be used concurrently with legacy loop guard approaches.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

According to various aspects of the present disclosure, a processing resource of a network switch detects a physical loop in the non-native VLAN by configuring a set of multiple network chips associated with an interface of multiple interfaces of the network switch to provide an indication regarding a MAC move event for the interface. The interface is associated with the non-native VLAN. Upon receipt of the indication, determine whether a number of MAC move events for the interface meet an event count threshold within each unit of time of multiple consecutive units of time. When the determination is affirmative, existence of the physical loop is identified. Non-limiting examples of network chips associated with receipt of packets on interfaces of network devices include ASICs produced by Marvell Technology and Broadcom.

Figure 1:
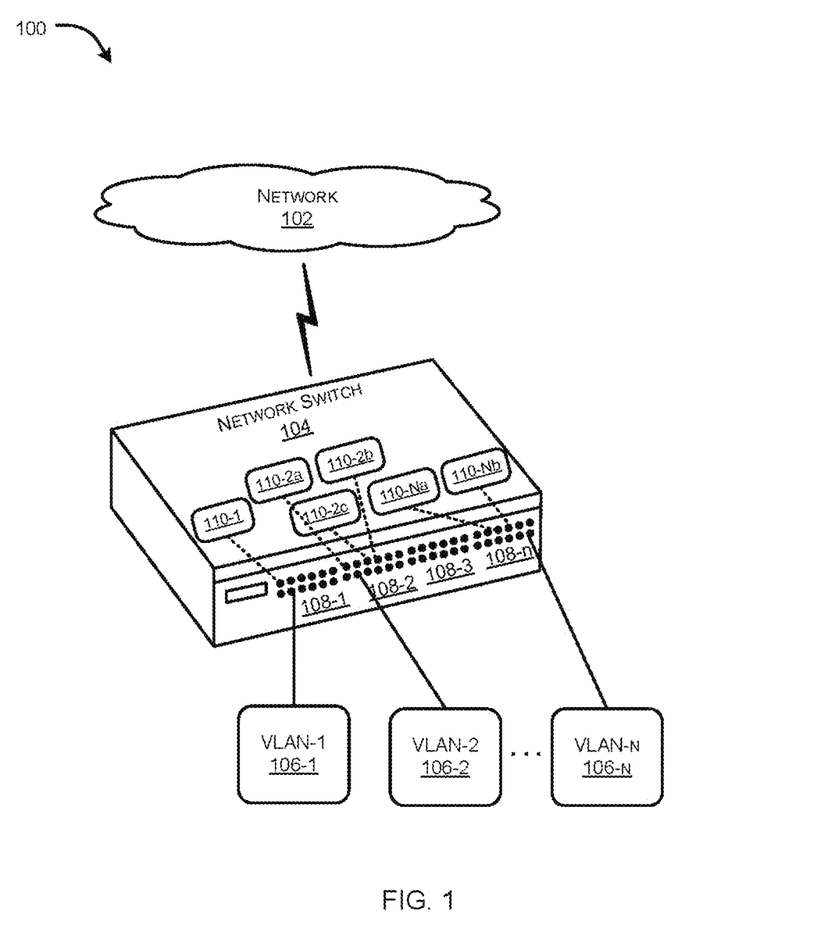
FIG. 1 illustrates an example network architecture in which various embodiments of the present disclosure may be implemented.

FIG. 1 illustrates an example network architecture 100 in which various embodiments of the present disclosure may be implemented. According to an embodiment, a technique for detecting a physical loop in non-native VLANs (not labeled) of multiple VLANs 106-1, 106-2, . . . , 106-N (which may be collectively referred to herein as VLANs 106 and may be individually referred to herein as VLAN 106) is disclosed. In an implementation, a processing resource of the network switch 104 configures a set of one or more network chips 110-1, 110-2a, 110-2b, 110-2c, . . . , 110-Na (which may be collectively referred to herein as network chips 110 and may be individually referred to herein as network chip 110) associated with an interface of multiple interfaces 108-1, 108-2, . . . 108-N (which may be collectively referred to herein as interfaces 108 and may be individually referred to herein as interface 108) of the network switch 104 to provide an indication regarding a MAC move event for the interface. In response to receipt of the indication, it is determined whether a number of MAC move events for the interface meet an event count threshold within each unit of time of multiple consecutive units of time. Depending upon the particular type of network chip, the indication may include a MAC address of a packet received on the interface or the indication may include the entirety of the packet received on the interface.

In an embodiment, the unit of time may be one second. The multiple consecutive units of time may be configurable and may be greater than 6. When the determination is affirmative, existence of the physical loop is identified. In response to identification of existence of the physical loop, the interface may be shut down for a timeout interval.

In an embodiment, the set of network chips 106 may be represented in a form of an Application Specific Integrated Chip (ASIC). The event count threshold may be configurable and the event count threshold may be based on multiple of (i) a processing capability of the processing resource; (ii) multiple class of service (COS) queue rate limits for multiple types of packets, and (iii) a number of interfaces of the multiple interfaces on which MAC move event tracking may be enabled.

Figure 2:
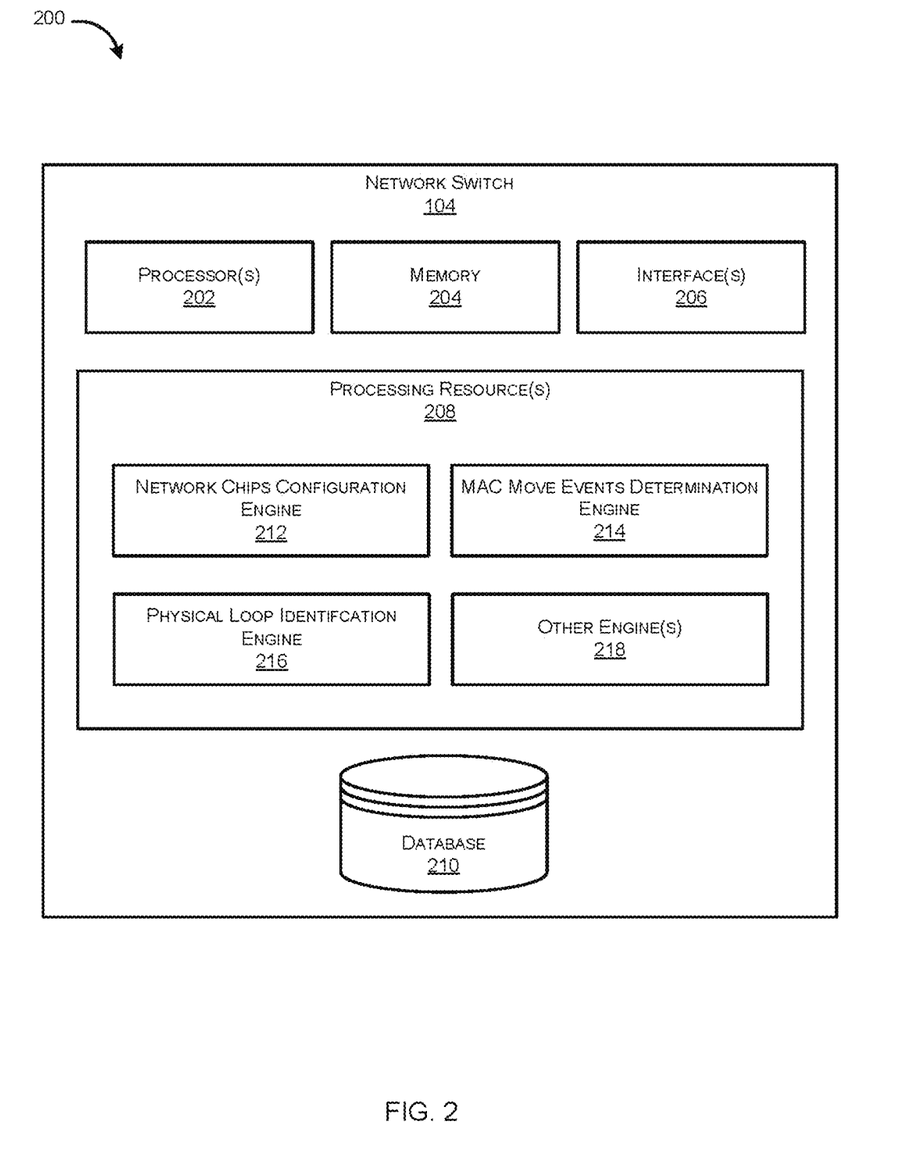
FIG. 2 is a block diagram illustrating functional components of a network switch in accordance with an embodiment of the present disclosure.

FIG. 2 is a block diagram 200 illustrating functional components of a network switch 104 in accordance with an embodiment of the present disclosure. In the context of the present example, the network switch 104 may include one or more processor(s) 202. Processor(s) 202 may be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the network switch 104. Memory 204 may store one or more computer-readable instructions or routines, which may be fetched and executed to create or share the data units over a network service. Memory 204 may include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Network switch 104 may also include one or more Interface(s) 206. Interface(s) 206 may include a variety of interfaces, for example, interfaces for data input and output devices, referred to as I/O devices, storage devices, and the like. Interface(s) 206 may facilitate communication of network switch 104 with various devices coupled to network switch 104. Interface(s) 206 may also provide a communication pathway for one or more components of network switch 104. Examples of such components include, but are not limited to, processing resource(s) 208 and database 210.

Processing resource(s) 208 may be implemented as a combination of hardware and software or firmware programming (for example, programmable instructions) to implement one or more functionalities of resource(s) may. In the examples described herein, such combinations of hardware and software or firmware programming may be implemented in several different ways. For example, the programming for the resource(s) 208 may be processor executable instructions stored on a non-transitory machine-readable storage medium and the hardware for resource(s) 208 may include a processing resource (for example, one or more processors), to execute such instructions. In the examples, the machine-readable storage medium may store instructions that, when executed by the processing resource, implement resource(s) 208. In such examples, network switch 104 may include the machine-readable storage medium storing the instructions and the processing resource to execute the instructions, or the machine-readable storage medium may be separate but accessible to network switch 104 and the processing resource. In other examples, processing resource(s) 208 may be implemented by electronic circuitry. Database 210 may include data that is either stored or generated as a result of functionalities implemented by any of the components of processing resource(s) 208.

In an example, processing resource(s) 208 may include network chips configuration engine 212, MAC move events determination engine 214, physical loop identification engine 216, and other engine(s) 218. Other engine(s) 218 may implement functionalities that supplement applications or functions performed by network switch 104 or processing resource(s) 208.

According to an embodiment, network chips configuration engine 212 may configure a set of one or more network chips associated with an interface of multiple interfaces of the network switch to provide an indication regarding a MAC move event for the interface. The interface may be associated with the non-native VLAN. The set of one or more network chips may be represented in a form of an ASIC. The indication may include a MAC address of a packet received on the interface and/or may include an entirety of a packet received on the interface.

According to an embodiment, responsive to receipt of the indication, MAC move events determination engine 214 determines whether a number of MAC move events for the interface meets an event count threshold within each unit of time of multiple consecutive units of time. The unit of time may be one or more seconds. The multiple consecutive units of time may be configurable and may be greater than 6.

The event count threshold may be configurable and may be based on one or more of (i) a processing capability of the processing resource, (ii) one or more COS queue rate limits for one or more types of packets; and (iii) a number of interfaces of the multiple interfaces on which MAC move event tracking is enabled.

According to an embodiment, when the determination is affirmative, the physical loop identification engine 216 identifies existence of the physical loop. Upon identifying the existence of the physical loop, the interface at issue may be shut down for a timeout interval.

Figure 3:
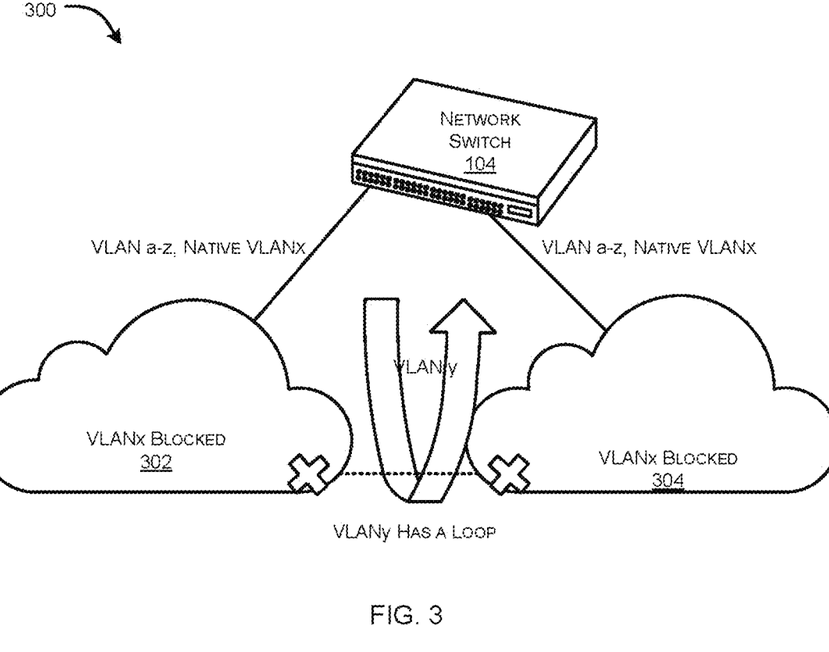
FIG. 3 illustrates a generalized view of an approach for detecting occurrence of a physical loop in a native VLAN while failing to detect occurrence of a VLAN loop in a non-native VLAN.

FIG. 3 illustrates a generalized view 300 of a loop guard approach for detecting occurrence of a physical loop in a native VLAN while failing to detect occurrence of a VLAN loop in a non-native VLAN. In the context of the present example, the loop guard approach of sending loop-guard packets only within the native VLAN's broadcast domain works well for identifying the existence of a physical loop within the native VLAN (e.g., VLANx); however, this approach cannot detect a physical loop in non-native VLANs, for example, if the loop-guard broadcast packets are blocked or there is no physical loops in the native VLAN. One proposed approach to address this issue involves sending loop-guard packets are sent on all VLANs (e.g., VLAN a-z and VLANx). As those skilled in the art will appreciate, such an approach does not scale well as the number of VLANs increases because it requires transmission of at least one loop-guard packet per VLAN broadcast domain.

Figure 4:
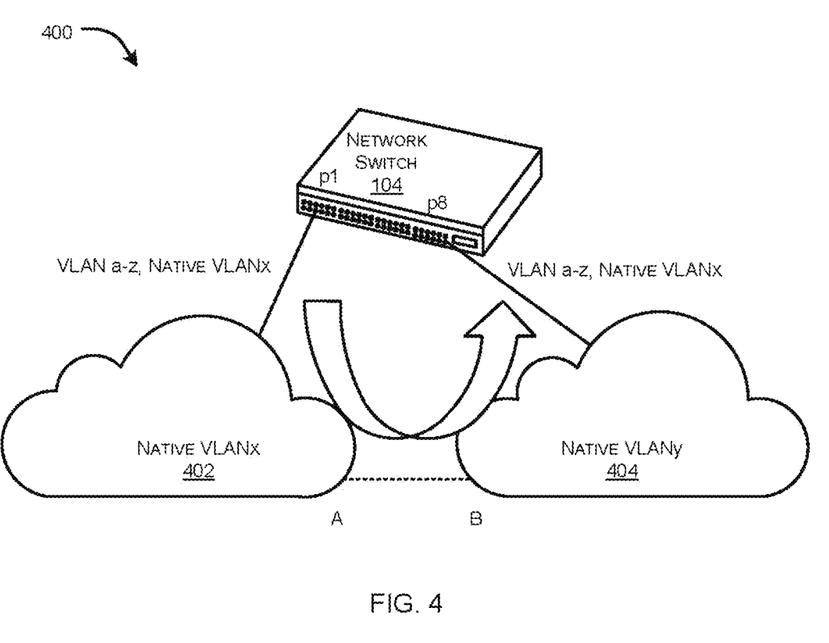
FIG. 4 illustrates a generalized view of a loop guard approach for detecting occurrence of a physical loop in a native VLAN.

FIG. 4 illustrates a generalized view 400 of a loop guard approach for detecting occurrence of a physical loop in a native VLAN. In the context of FIG. 4 two interfaces of network switch 104 may be connected with mismatched native VLAN settings at both ends of native VLANs (e.g., 402 and 404). In such a scenario, the use of a MAC move threshold to detect a physical loop may not be of any use to detect the loop. However, the loop may be detected by using the legacy loop guard approach described above (e.g., in connection with FIG. 3). If the legacy loop guard approach is enabled at interface p1, the legacy loop guard approach may detect that its packets are forwarded back to interface p8 of VLAN y since VLAN x traffic may traverse from A to B.

Figure 5:
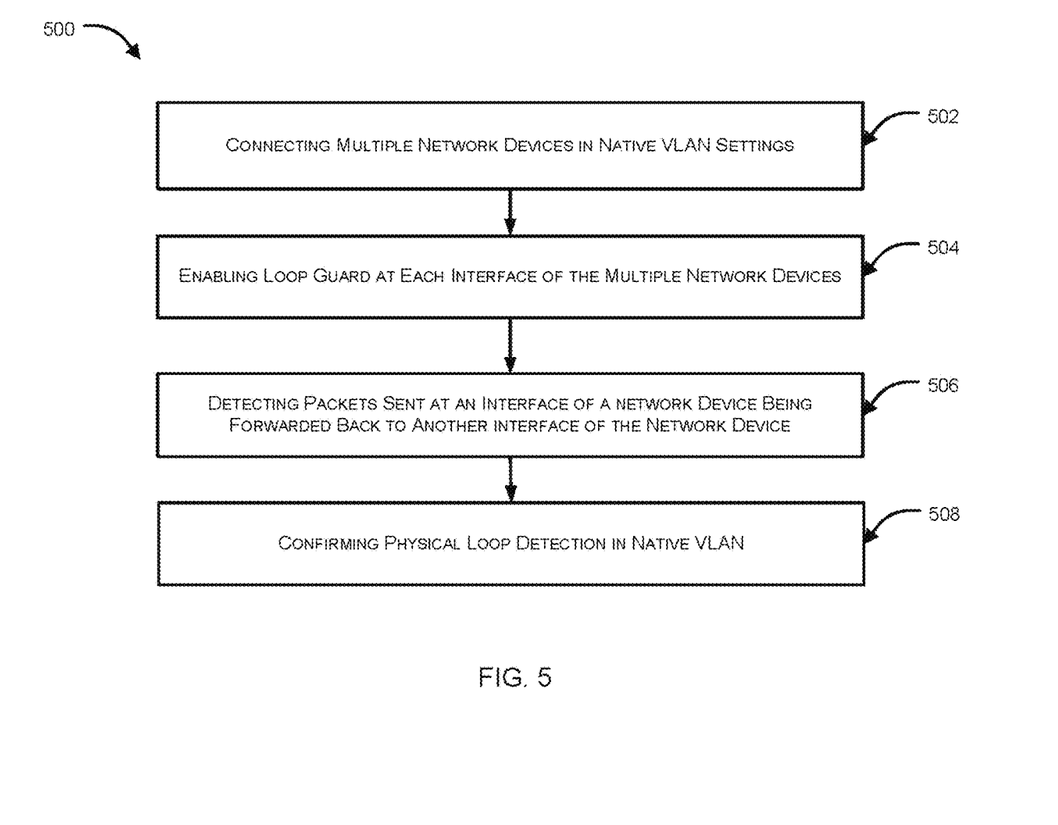
FIG. 5 is a flow diagram illustrating an enhanced loop guard approach for detecting an occurrence of a physical loop in a native VLAN.

FIG. 5 is a flow diagram 500 illustrating a loop guard approach for detecting an occurrence of a physical loop in a native VLAN. At block 502, multiple network devices may be coupled in communication via a native VLAN. At block

504, loop guard functionality may be enabled at each interface of the multiple network devices to cause loop guard probe packets to be periodically be transmitted within the broadcast domain of the native VLAN. At block 506, it may be determined that whether the loop-guard packets sent on an interface of the network device are received on another interface of the network device. If so, at block 508, detection of the physical loop is confirmed in the native VLAN.

In accordance with various embodiments described herein, a high rate of MAC address movement/flap may be used by the enhanced loop guard approach as an indicator of a physical loop in a non-native VLAN. As will be appreciated by those skilled in the art, in order to detect physical loops in both native and non-native VLANs, the proposed approach of detecting MAC move events described herein may be used in combination with existing loop-guard approaches (e.g., periodically sending probe packets within the native VLAN's broadcast domain). According to one embodiment, the enhanced loop guard approach (e.g., a scalable non-native VLAN loop detection approach) may facilitate addition of a new user configurable loop guard MAC move threshold parameter per interface on top of existing loop-guard features. The threshold may take effect only when the new enhanced loop-guard feature is enabled.

In the context of various examples, whenever MAC address movement/flap is detected on an interface with loop-guard enabled with a non-zero threshold, a MAC move counter associated with that interface may be incremented by one regardless of the ingress VLAN on which the MAC was observed and regardless of the source MAC address. In one embodiment, the existence of a physical loop within the native VLAN is detected when a loop guard MAC move count for a loop-guard enabled interface has exceeded the configured MAC move threshold on a loop-guard enabled interface for more than a predetermined or configurable number of units of time (e.g., 6 consecutive seconds). Responsive to detection of the loop, the enhanced loop guard functionality may trigger a loop detected event (e.g., by notifying a loop guard daemon) and cause the interface at issue to be shutdown for a loop guard timeout interval. After the timeout interval expires, the interface may be brought up again consistent with legacy loop-guard behavior.

Example Command Line Interface (CLI) Commands
FS1E483Z17000004 #conf switch interface
FS1E483Z17000004 (interface) #edit port1
FS1E483Z17000004 (port1) #set loop-guard enabled
FS1E483Z17000004 (port1) #set loop-guard-MAC-move 50

The loop guard MAC move threshold may be set within a range that is dependent upon, among other factors, the network device platform at issue and the type of network chips employed by the particular network device platform. In some embodiments, the range is 0 to 100 or 0 to MAC moves per unit of time. The default loop guard MAC move threshold may be set to 0 facilitate use of a legacy loop guard approach without performing the enhanced loop-guard functionality (e.g., detection of loop guard MAC move events), whereas any setting greater than 0 may cause the enhanced loop-guard functionality (e.g., the counting of MAC moves) to be performed concurrently with the use of the legacy loop guard approach. At the high end of the range, the loop guard MAC move threshold may be selected based on a processing capability of the network device at issue. A lower MAC move threshold may result in a higher probability of a false positive loop detection. One solution to avoid such false positives is to provide high-powered CPU platforms with a larger range (e.g., a threshold up to 200). Another consideration in selecting the appropriate threshold may be the existence of various COS queue rate limits implemented by different platforms. For example, as those skilled in the art will appreciate, since there are CPU COS queues to rate limit packets, the total configured MAC move thresholds for all ports in a switch should be less than the CPU rate limit. For example, in the context of a switch having a CPU rate limit of 500 packets per second (pps), users may be allowed to configure the MAC move threshold to 50 pps for 10 ports or 100 pps for 5 ports. In this manner, in the worst scenario, all MAC move packets can be processed by the CPU simultaneously.

Implementations are ASIC Family Dependent

In the context of a Broadcom-based switch, for example, a thread may be used to periodically scan the hardware Layer 2 (L2) table to detect any MAC change events; however, this may not be an ideal way to detect a loop as the thread may not run frequently enough for the desired unit of time. An alternative approach involves causing the these types of network chips to copy a portion or the entirety of received packets to the CPU of the network device at issue when a new MAC address is observed. For example, when the interface detects a MAC move, the packet information may be captured by a callback routine registered with the network chip at issue and the callback routine may determine whether the MAC move events exceed the configured threshold.

Other chipsets, for example, those from Marvell, may provide a mechanism (e.g., via a software developer kit (SDK)) that avoids copying packet information to the CPU and instead may allow for rapid MAC move/flap event indications (e.g., in the form of a MAC address) to be captured via a MAC move notification.

Figure 6:
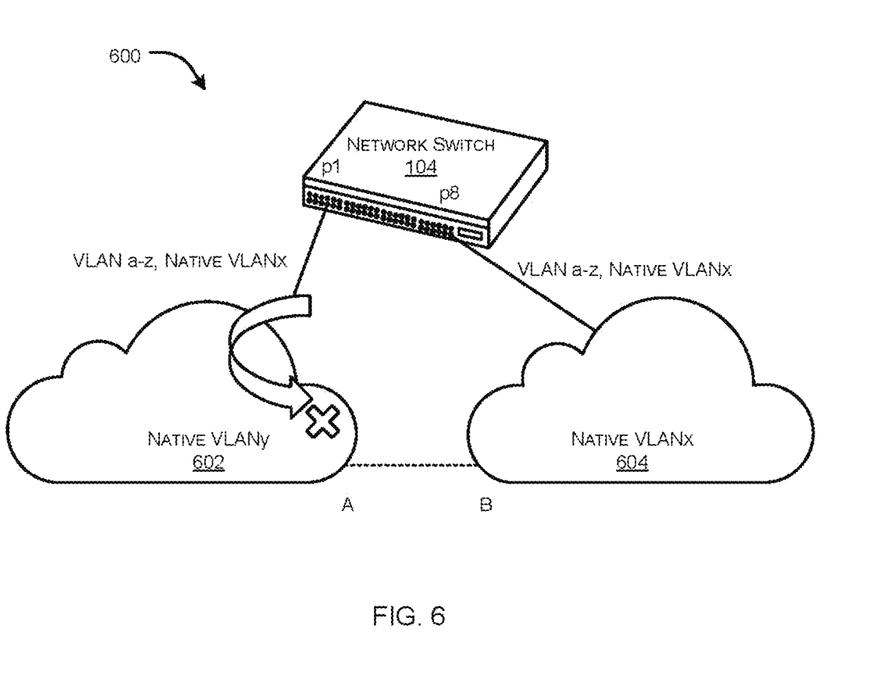
FIG. 6 illustrates a generalized view of a MAC move monitoring approach for detecting occurrence of a VLAN loop in a non-native VLAN in accordance with an embodiment of the present disclosure.

FIG. 6 illustrates a generalized view 600 of a MAC move approach for detecting an occurrence of a VLAN loop in a non-native VLAN in accordance with an embodiment of the present disclosure. In the context of FIG. 6, a reverse native VLAN setting of the A-B connection is illustrated. Here the legacy loop guard functionality enabled at interface p1 may fail to detect a loop. This may occur because VLAN x 604 traffic may be blocked at A. Further, the loop guard packets from interface p1 may also be dropped and may not reach to VLAY y 602. Thus, the loop guard functionality enabled at interface p1 alone may not detect a loop. However, loop guard probe packets send on VLAN x 604 of interface p8 may traverse from B to A. Therefore when interface p8 has legacy loop guard functionality enabled, the loop may be detected. Those skilled in the art will appreciate that since a topology loop may often be caused by user errors such as network misconfigurations or cable misconnections and information of the native VLAN, settings of A and B may not be available. Also it may be recommended to enable the loop guard and determine the MAC move of both the interfaces of network switch 104 to cover the various scenarios described herein.

Figure 7:
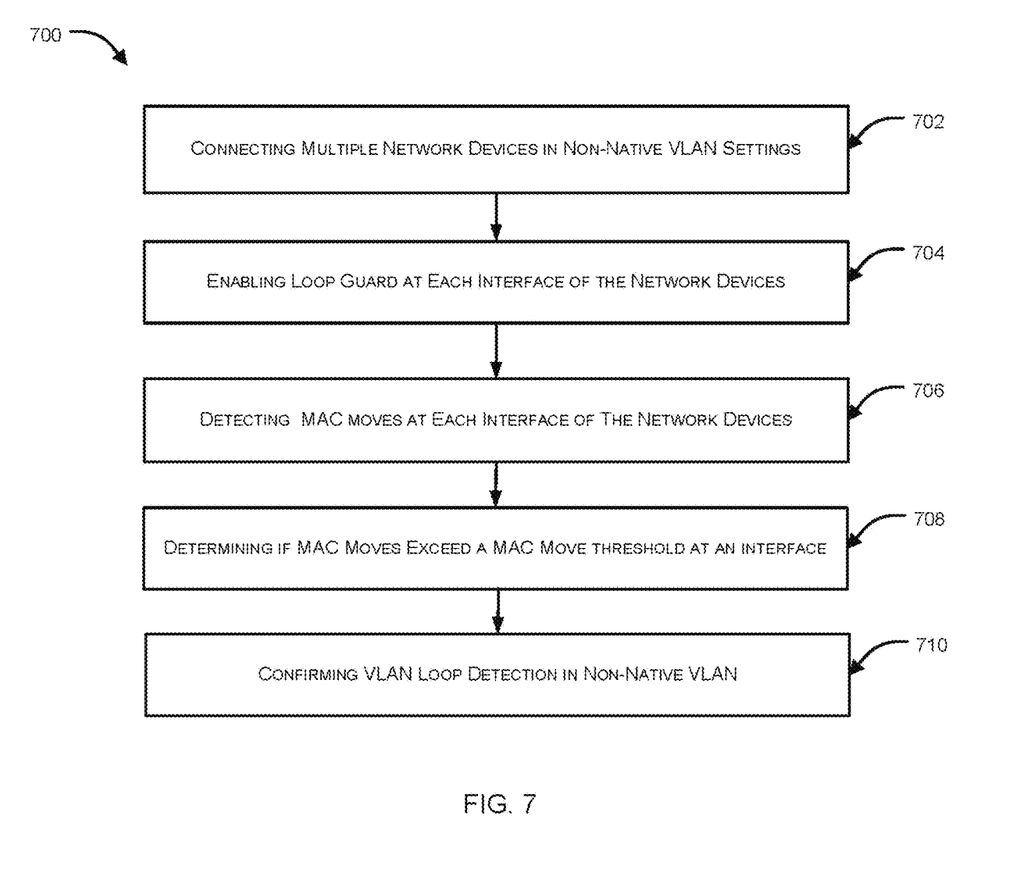
FIG. 7 is a flow diagram illustrating a MAC move monitoring approach for detecting occurrence of a VLAN loop in a non-native VLAN in accordance with an embodiment of the present disclosure.

FIG. 7 is a flow diagram illustrating a MAC move approach for detecting an occurrence of a VLAN loop in a non-native VLAN in accordance with an embodiment of the present disclosure. At block 702, multiple network devices may be connected in non-native VLAN settings. At block 704, enhanced loop guard functionality may be enabled on various interfaces of the multiple network devices (e.g., by setting the loop guard MAC move threshold to a value greater than 0). At block 706, MAC moves may be detected at the interfaces of the network devices. Further, at block 708, it is determined whether the detected MAC moves exceed a MAC move threshold at an interface for more than a predetermined or configurable threshold of units of time (e.g., >50 MAC moves per second for 6 consecutive seconds). When the determination is affirmative, at block 710, the existence of a physical loop in the non-native VLAN is confirmed.

Figure 8:
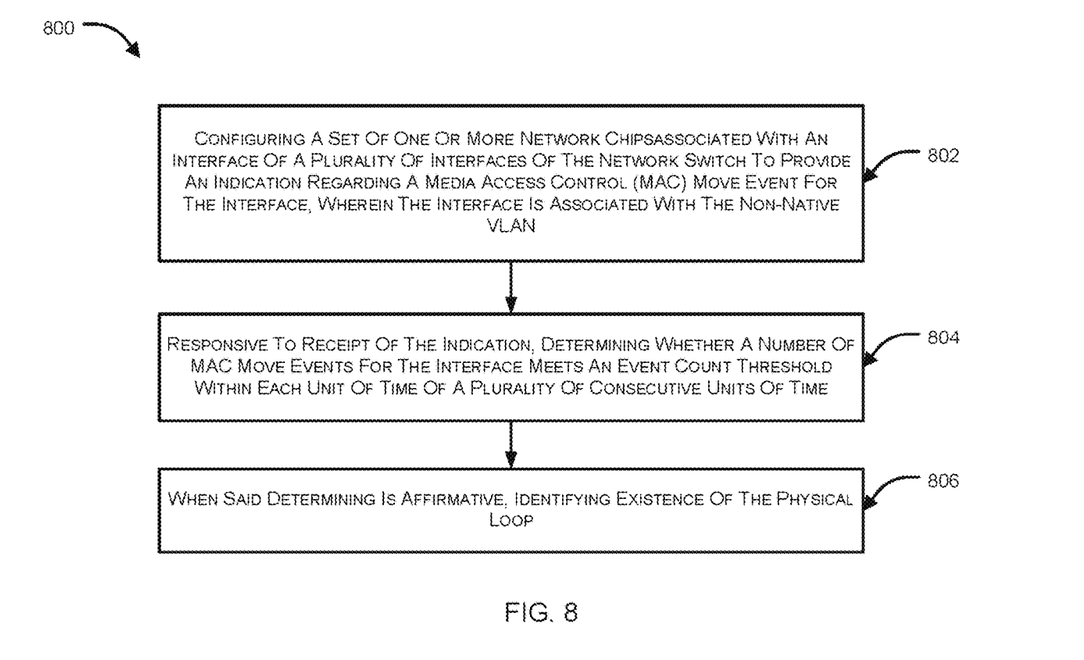
FIG. 8 is a flow diagram illustrating an enhanced loop guard process for detection of a physical loop in a network in accordance with an embodiment of the present disclosure.

FIG. 8 is a flow diagram illustrating an enhanced loop guard process for detection of a physical loop in a network in accordance with an embodiment of the present disclosure. The process described with reference to FIG. 8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more network devices of various forms, such as the computer system 900 described with reference to FIG. 9 below.

In the context of the present example, at block 802, a set of one or more network chips associated with an interface (associated with the non-native VLAN) of multiple interfaces of the network switch are configured to provide an indication regarding a MAC move event for the interface.

In response to receipt of the indication, at block 804, it is determined whether a number of MAC move events for the interface meet an event count threshold within each unit of time of multiple consecutive units of time. For example, detection of a physical loop within a non-native VLAN may be triggered by 50 MAC move events being observed within one second on a particular interface for more than 6 consecutive seconds.

Further, at block 806, the existence of the physical loop may be identified when the determination is affirmative.

Figure 9:
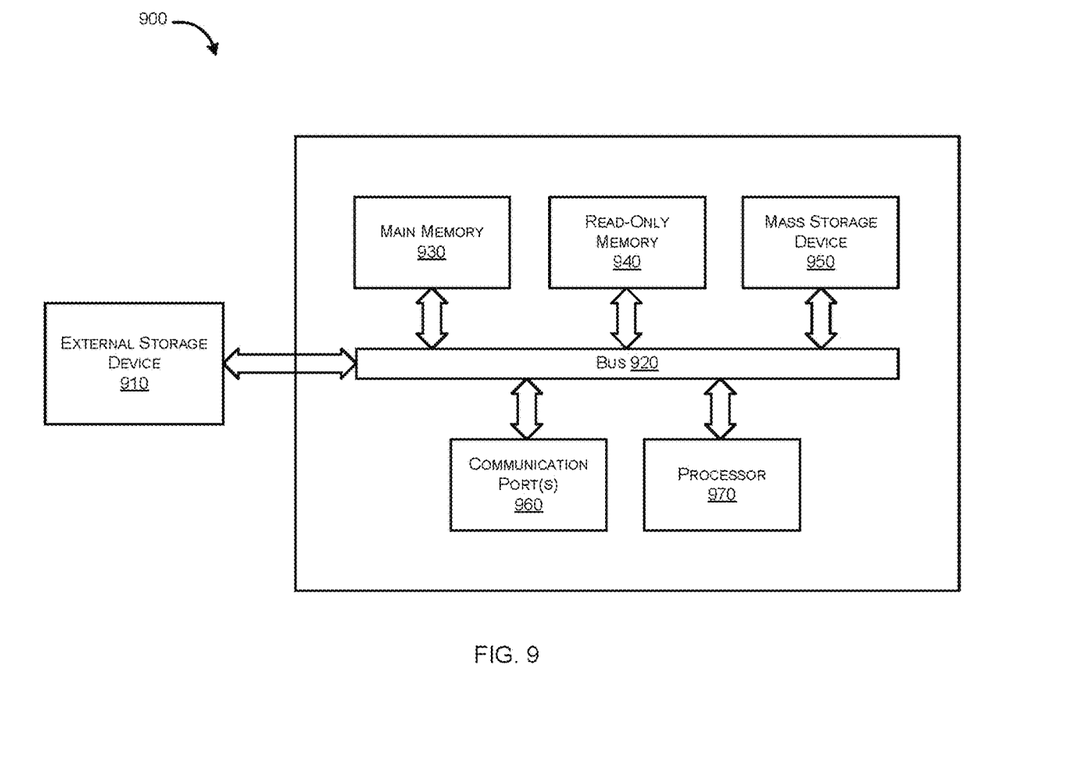
FIG. 9 illustrates an exemplary computer system in which or with which embodiment of the present disclosure may be utilized.

FIG. 9 illustrates an exemplary computer system 900 in which or with which embodiment of the present disclosure may be utilized. As shown in FIG. 9, computer system includes an external storage device 910, a bus 920, a main memory 930, a read only memory 940, a mass storage device 950, a communication port 960, and a processor 970. In one embodiment, computer system 900 may represent some portion of a network switch (e.g., network switch 104 of FIG. 1, FIG. 3, FIG. 4 or FIG. 6).

Those skilled in the art will appreciate that computer system 900 may include more than one processing resource (e.g., processor 970) and communication ports 960. Non-limiting examples of processor 970 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 970 may execute instructions of various modules associated with embodiments of the present disclosure.

Communication port 960 can be any of an RS-232 port for use with a modem based dialup connection, a 10/100 Ethernet port, a Gigabit, 10 Gigabit, 25G, 40G, and 100G port using copper or fiber, a serial port, a parallel port, or other existing or future ports. Communication port 960 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g. start-up or BIOS instructions for processor 970.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

What is claimed is:

1. A method performed by a processing resource of a network switch for detecting a physical loop in a non-native Virtual Local Area Network (VLAN), the method comprising:
   configuring a set of one or more network chips associated with an interface of a plurality of interfaces of the network switch to provide an indication regarding a Media Access Control (MAC) move event for the interface, wherein the interface is associated with the non-native VLAN;
   responsive to receipt of the indication, determining whether a number of MAC move events on the non-native VLAN for the interface meets an event count threshold within each unit of time for consecutive units of a plurality of consecutive units of time; and
   identifying existence of the physical loop on the non-native VLAN based on determining being affirmative.

2. The method of claim 1, further comprising responsive to said identifying existence of the physical loop, shutting down the interface for a timeout interval.

3. The method of claim 1, wherein the set of one or more network chips are represented in a form of an Application Specific Integrated Chip (ASIC).

4. The method of claim 1, wherein the unit of time is one second.

5. The method of claim 4, wherein the plurality of consecutive units of time is greater than 6.

6. The method of claim 1, wherein the plurality of consecutive units of time is configurable.

7. The method of claim 1, wherein the event count threshold is configurable.

8. The method of claim 1, wherein the event count threshold is based on one or more of: a processing capability of the processing resource; one or more class of service (COS) queue rate limits for one or more types of packets; and a number of interfaces of the plurality of interfaces on which MAC move event tracking is enabled.

9. The method of claim 1, wherein the indication comprises a MAC address of a packet received on the interface.

10. The method of claim 1, wherein the indication comprises an entirety of a packet received on the interface.

11. A network switch for detecting a physical loop in a non-native Virtual Local Area Network (VLAN), said network switch comprising:
    a processing resource; and
    a non-transitory computer-readable medium, coupled to the processing resource, having stored therein instructions that when executed by the processing resource cause the processing resource to:
    configure a set of one or more network chips associated with an interface of a plurality of interfaces of the network switch to provide an indication regarding a Media Access Control (MAC) move event for the interface, wherein the interface is associated with the non-native VLAN;
    responsive to receipt of the indication, determine whether a number of MAC move events on the non-native VLAN for the interface meets an event count threshold within each unit of time for consecutive units of a plurality of consecutive units of time; and
    identify existence of the physical loop on the non-native VLAN based on determining being affirmative.

12. The network switch of claim 11, wherein, further comprising responsive to said identifying existence of the physical loop, shutting down the interface for a timeout interval.

13. The network switch of claim 11, wherein the set of one or more network chips are represented in a form of an Application Specific Integrated Chip (ASIC).

14. The network switch of claim 11, wherein the unit of time is one second.

15. The network switch of claim 14, wherein the plurality of consecutive units of time is greater than 6.

16. The network switch of claim 11, wherein the plurality of consecutive units of time is configurable.

17. The network switch of claim 11, wherein the event count threshold is configurable.

18. The network switch of claim 11, wherein the event count threshold is based on one or more of: a processing capability of the processing resource; one or more class of service (COS) queue rate limits for one or more types of packets; and a number of interfaces of the plurality of interfaces on which MAC move event tracking is enabled.

19. The network switch of claim 11, wherein the indication comprises a MAC address of a packet received on the interface.

20. A non-transitory computer-readable storage medium embodying a set of instructions, which when executed by one or more processors of a network switch, causes the one or more processors to perform a method comprising:
    configuring a set of one or more network chips associated with an interface of a plurality of interfaces of the network switch to provide an indication regarding a Media Access Control (MAC) move event for the interface, wherein the interface is associated with the non-native a VLAN;
    responsive to receipt of the indication, determining whether a number of MAC move events on the non-native VLAN for the interface meets an event count threshold within each unit of time for consecutive units of a plurality of consecutive units of time; and
    identifying existence of the physical loop on the non-native VLAN based on determining being affirmative.

* * * * *